Patented Jan. 18, 1949

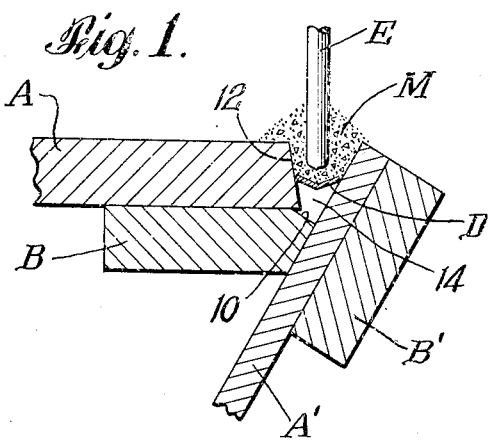
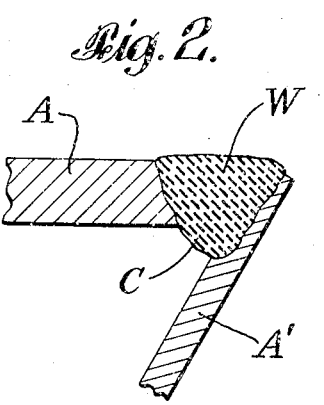
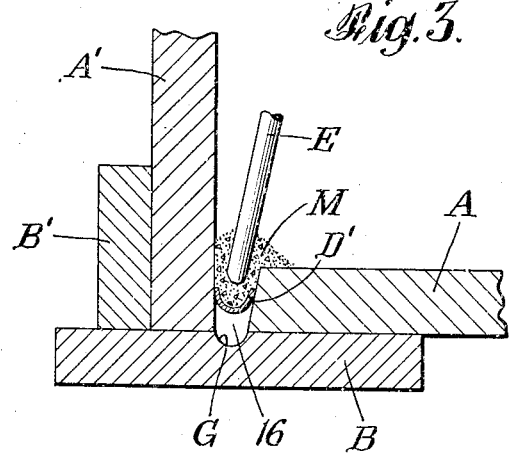
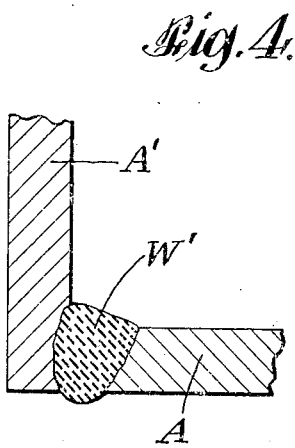
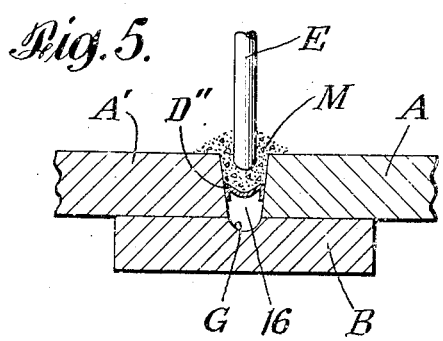
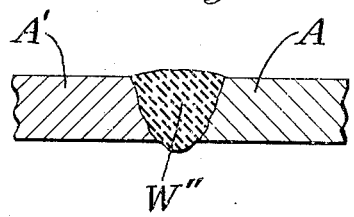

2,459,242

UNITED STATES PATENT OFFICE 2,459,242

BLANKETED ELECTRIC WELDING WITH A FUSIBLE TROUGH TO SUPPORT THE COMMINUTED MINERAL COMPOSITION ABOVE THE BOTTOM OF THE WELDING ZONE

Frank Rothe, Niagara Falls, N. Y., assignor to The Linde Air Products Company, a corporation of Ohio Application June 30, 1945, Serial No. 602,555

6 Claims. (Cl. 219—10)

This invention relates to electric welding, and more particularly to an improved method of submerged melt welding which results in welds of uniformly good upper and lower surface characteristics.

Jones, Kennedy, and Rotermund, in U. S. Patent 2,043,960, have disclosed a commercially successful process of electric welding under a blanket of prefused, comminuted mineral composition. Under conditions as hereinafter described, however, it has been found difficult or impossible in the past to produce certain welds of high quality.

It is the principal purpose of the present invention to provide improvements in the process whereby welds can be produced under such conditions, that are sound, free from exogenous inclusions resulting from entrapment of welding flux not floated out in the normal course of the welding operation, of the desired upper and lower reinforcement contours, and free from undercutting.

In its simplest form the invention comprises a fusible partition, such as a light-gauge metal trough of appropriate form and composition, disposed in and extending throughout the length of the welding V or interspace between the metal members to be joined, and supporting the fusible comminuted mineral welding composition in which the end of the welding electrode is submerged during welding. The welding composition is thus prevented from entering such space below the partition, and from filling the groove in the backing chill-plate when the latter is employed. This groove in the backing chill-plate is a useful feature in certain types of welding. For example, in single-pass, fully penetrated welds, it serves to mould the reinforcing bead on the underside of the weld to a desired predetermined contour.

In the drawing:

Fig. 1 is a view, mainly in cross-section, of a welding assembly exemplifying the invention;

Fig. 2 is a similar view of the resulting weldment; and

Figs. 3 and 5, and Figs. 4 and 6, are views similar to Figs. 1 and 2, respectively, of modifications of the invention.

Although the technique of electric welding under a blanket of prefused, comminuted, mineral composition is well established, and welds of a highly satisfactory character are consistently produced thereby, there are, nevertheless, conditions under which the preparation and production of such welds severely taxes the ingenuity and skill of the operator. These circumstances are brought about as much by factors of economics as by questions of design. In instances in which it is not intended to finish with a second weld on the underside of the first, it is obvious that complete fusion and penetration through the work must be obtained in the single pass weld, and this is not usually difficult with proper beveling of the juxtaposed ends of the members being welded. It sometimes happens, however, that the cost of this beveling operation is not economically justified, and the ends are left in the unfinished condition, for example "as-sheared."

In order to obtain proper fusion and penetration in a weld between two such unbeveled members, or two whose angles of bevel are relatively small, it is necessary that the juxtaposed ends be interspaced. In the usual submerged melt welding operation, the comminuted mineral composition fills this interspace and the groove in the backing chill-plate as well, and although such material melts as the welding action proceeds, it is not always floated out by the molten metal, and subsequently freezes in situ. The result is an absence of metal in the space originally intended to form the reinforcing bead, and, not infrequently, even an undercutting on the bottom surface of the weld. The additional space provided by a properly designed V permits greater freedom of movement of the molten mass of metal and mineral composition, with suitable floating-out of the latter.

In cases in which it is intended to finish the second weld on the underside of the first, and/or in which it is necessary to prevent the weld from sticking to the platen surface below—a common circumstance in ship-welding—the above-described interspacing of the ends to be joined is the usual practice, since in these instances the undercutting is an innocuous feature, rather than one to be avoided.

Fig. 1 illustrates a weldment type that presents the above-described difficulties. In the drawing A and A' are the metal members, such as steel plates, to be joined, and B and B' the backing chill-plates composed, for example, of copper or other high-heat-conducting material, appropriately designed, for example, in the case of B at 10, to mold the resulting reinforcing bead C. The end 12 of member A is not beveled, but is in the original "as-sheared" condition. Prior attempts to complete this type of weld, whether the members abut each other or are interspaced, resulted in lack of penetration or undercutting.

According to the present invention, a partition such as a light-gauge metal trough D of appropriate form and composition, is disposed in the V or interspace 14 between the ends of the two members A and A' to be joined, to divide the interspace into upper and lower portions. The trough D may be composed of ferrous metal, and be of open V cross-section. The trough supports the pre-fused comminuted mineral composition M and substantially excludes it from the lower portion of such V or interspace below the partition. The trough D extends completely across the lower portion of the V 14 and is coextensive with the welding groove.

The insertion of the trough D, as indicated, which prevents the comminuted mineral composition M from filling the reinforcement bead space, results in a sound weld W with no undercutting and with a satisfactory reinforcing bead C. The trough D is melted while the welding is carried out by completing a welding circuit through the work and a fusible metal welding rod or electrode E. The welding rod E is moved longitudinally of the V while it melts and is fed into the welding zone as the welding progresses. The resulting weld area W is clearly indicated by the shaded portion in Fig. 2.

Figs. 3 and 5 illustrate other structural forms wherein welding difficulties of a similar nature were encountered, but in which a fusible partition D' or D'' of the invention again provided the necessary means for obtaining satisfactory results.

In Fig. 3 the chill-plate B is provided with an upper groove G and the chill-plate B' is mounted on the chill-plate B so as to form an included angle of 90° in which angle one metal member A' to be welded is disposed with a lower corner juxtaposed with respect to the inner edge of the groove G. The other member A to be welded is disposed on the chill-plate B with its lower corner juxtaposed with respect to the outer edge of the groove G. The light-gauge metal trough D', which is curved downwardly in U cross-section is fitted in the welding space between the members A and A', in vertically spaced relation above the groove G. Thus, the comminuted mineral composition M is supported by the trough D', and is prevented from entering the open channel 16 in the lower part of the V on the groove G in the chill-plate B. The lower end of the electrode E is disposed in the mineral composition M and the welding current is caused to pass between such electrode E and the work A, A', progressively fusing the mineral composition M and the trough D' as the welding operation progresses longitudinally of the channel, welding together the members A and A' at W' as shown in Fig. 4.

In Fig. 5 the metal members A to be welded are arranged horizontally on a backing chill-plate B so that the welding space between the members A lies directly above groove G in the upper surface of the chill-plate B. In this example, the trough D'' is in the form of an M in cross-section, and supports the comminuted mineral composition M above the lower portion 16 of the space between the members A and the groove G, so that a sound weld W'' results.

The form of the fusible support or partition may vary within rather wide limits, that is, it may be a substantially flat strip spanning the lower part of the welding V or the interspace, or it may take the form of a V or U of any appropriate angle or curvature, respectively, the limitation being merely that it shall extend completely across the lower portion of the V or interspace and lengthwise thereof and in so doing prevent the mineral composition from entering or filling the lower part of the V or interface, and the groove in the backing chill-plate.

In the case of a particular commercial application in which the weldment was of the form illustrated in Fig. 2, ½ and 5/8-inch steel plates were welded together at an angle of approximately 59°. Inasmuch as the ½-inch member had not been beveled, an interspace of 3/16-inch was allowed and a trough prepared by bending a strip of 18-gauge sheet composed of ferrous metal to an angle of 35°. The resulting weld was highly satisfactory, from the point of view of soundness, cleanliness, penetration and fusion, and reinforcement on the underside of the weld. In a similar weld prepared without the insertion of a trough in the interspace, the lack of reinforcement on the underside of the weld, and the undercutting, were clearly evident. The mineral composition fused but was not floated out by the molten metal, and remained behind in the groove of the chill-plate and the base of the interspace.

What is claimed is:

1. In the art of electric welding work composed of metal parts with an electrode of fusible metal under a blanket of comminuted mineral composition, the improved process which comprises providing a welding groove between the parts to be welded which groove is separated by a thin partition of fusible metal into upper and lower portions, supplying comminuted mineral composition to the upper portion only of the welding groove, so that the lower portion of the welding groove is substantially empty prior to the welding operation, completing a welding circuit under such mineral composition through the electrode and work, moving the electrode longitudinally with respect to the groove, and progressively melting said electrode and partition under the mineral composition as the welding operation progresses along the groove to complete the weld in both portions of the groove in a single pass.

2. In the art of electric welding work composed of metal parts with a fusible metal electrode under a blanket of comminuted mineral composition, the improved process which comprises providing a welding groove between the parts to be welded, which groove is separated by a thin partition of fusible metal into upper and lower portions, filling only the upper portion of the welding groove with comminuted mineral composition, the lower portion of the welding groove being substantially empty prior to the welding operation, completing a welding circuit through such mineral composition through a fusible metal electrode and the work, feeding such electrode toward the work, moving the electrode longitudinally with respect to the groove as the electrode is fed toward the work, and completely melting said partition as the welding operation progresses along the groove so that weld is completed in both portions of the groove in a single pass of the electrode.

3. The method of blanketed electric welding which comprises arranging two metal members to provide a welding groove, mounting a thin fusible metal strip in said welding groove so as to divide the groove into upper and lower portions, filling the upper portion only with comminuted mineral composition, inserting the lower end of a welding rod of fusible metal in such composition, establishing an electric welding current between said rod and the work, feeding said rod toward the resulting welding zone, and moving the rod longitudinally of the groove as the welding operation progresses, so as to progressively fuse said welding rod and strip and provide a sound and complete weld extending to the bottom of the groove in a single pass.

4. In the art of electric welding work composed of metal parts with an electrode of fusible metal under a blanket of comminuted mineral composition, the improved process which comprises juxtaposing the parts to be welded and at least one chill-plate so that a welding groove is provided between such parts, which groove is separated by a thin partition of fusible metal into upper and lower portions, the lower portion of the groove having a transversely depressed bottom surface, supplying comminuted mineral compositions to only the upper portion of the welding groove, the lower portion of the welding groove being substantially empty prior to the welding operation, completing a welding circuit under such mineral composition through the electrode and the work, moving the electrode longitudinally with respect to the groove, and melting said partition in its entirety and fusing said electrode as the welding operation progresses along the groove so as to complete the weld in both portions of the groove in a single pass of the electrode.

5. In the art of electric welding work composed of metal parts with a fusible metal electrode under a blanket of comminuted mineral composition, the improved process which comprises juxtaposing the parts to be welded to provide a welding V therebetween, arranging chill-plates in contact with the opposite sides of the parts to be welded adjacent the welding V, one of the chill plates cooperating with the welding V to provide a closed bottom surface for the V, fitting a trough composed of light gauge fusible metal into the welding V substantially medially thereof to provide upper and lower parts in the V, supplying comminuted mineral welding composition to the upper part of the V, completing a welding circuit under such mineral composition through a fusible metal electrode and the work, feeding such electrode toward the work, moving the electrode longitudinally with respect to the groove as the electrode is fed to the work, and melting said trough as the welding operation progresses along the V whereby the weld is completed in both the upper and lower parts of the V in a single pass of such electrode.

6. An electric welding process as defined by claim 5, in which the metal parts to be welded are disposed so that one of the parts is substantially horizontal and the other part is disposed at an acute angle with respect to the first part.

FRANK ROTHE.

REFERENCES CITED

The following references are of record in the file of this patent:

UNITED STATES PATENTS

| Number | Name | Date |
|--------|------|------|
| 1,950,393 | Boardman | Mar. 13, 1934 |
| 1,961,117 | Wall | May 29, 1934 |
| 2,043,960 | Jones et al. | June 9, 1936 |
| 2,145,009 | Keir | Jan. 24, 1939 |

OTHER REFERENCES

Welding Encyclopedia, 11th edition, 1943, The Welding Engineer Publishing Co., 506 South Wabash Avenue, Chicago, Illinois, page 114.